US 9,859,796 B2

(12) United States Patent
Yoon et al.

(10) Patent No.: US 9,859,796 B2
(45) Date of Patent: Jan. 2, 2018

(54) BUCK-BOOST CONVERTER AND OPERATING METHOD

(71) Applicant: SAMSUNG ELECTRONICS CO., LTD., Suwon-si, Gyeonggi-do (KR)

(72) Inventors: Gil-Won Yoon, Seoul (KR); Dong-Jin Keum, Suwon-si (KR); Yus Ko, Yongin-si (KR); Gwang-Yol Noh, Anyang-si (KR); Sung-Woo Moon, Seongnam-si (KR); Min-Ho Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 145 days.

(21) Appl. No.: 14/687,935

(22) Filed: Apr. 16, 2015

(65) Prior Publication Data

US 2015/0357916 A1    Dec. 10, 2015

(30) Foreign Application Priority Data

Jun. 10, 2014  (KR) .................. 10-2014-0070139

(51) Int. Cl.
*H02M 3/158*   (2006.01)

(52) U.S. Cl.
CPC ................. *H02M 3/1582* (2013.01)

(58) Field of Classification Search
CPC ...... H02M 3/145; H02M 3/155; H02M 3/156; H02M 3/158; H02M 3/1582; H02M 3/1584; H02M 3/1588; H02M 2001/007; H02M 2001/0067; Y02B 70/1466
USPC ................ 323/222–226, 247, 259, 261, 263, 323/271–275, 282–286, 299–303, 344, 323/351; 363/65, 74, 79, 81, 89, 363/123–127
See application file for complete search history.

(56) References Cited

U.S. PATENT DOCUMENTS

| 6,037,755 | A | 3/2000 | Mao et al. |
| 6,275,016 | B1 * | 8/2001 | Ivanov ................. H02M 3/158 |
| | | | 323/224 |
| 7,157,888 | B2 | 1/2007 | Chen et al. |
| 7,265,524 | B2 | 9/2007 | Jordan et al. |
| 7,495,419 | B1 | 2/2009 | Ju |
| 7,782,036 | B1 | 8/2010 | Wong et al. |
| 8,098,056 | B2 | 1/2012 | Yamazaki et al. |
| 8,319,483 | B2 | 11/2012 | Fishelov et al. |

(Continued)

FOREIGN PATENT DOCUMENTS

KR           102013003285 A       4/2013

*Primary Examiner* — Timothy J Dole
*Assistant Examiner* — Carlos Rivera-Perez
(74) *Attorney, Agent, or Firm* — Volentine & Whitt, PLLC

(57) ABSTRACT

A method of operating a buck-boost converter including an inductor and a capacitor includes; operating the buck-boost converter in boost mode until a level of an input voltage applied at an input node of the buck-boost converter reaches a desired level of an output voltage apparent at an output node of the buck-boost converter, and after the level of an input voltage reaches the desired level of the output voltage, operating the buck-boost converter in buck mode, wherein operating the buck-boost converter in buck mode and operating the buck-boost converter in boost mode overlap at least in part temporally proximate a point at which the level of the input voltage exceeds the level of the output voltage.

19 Claims, 21 Drawing Sheets

(56) References Cited

U.S. PATENT DOCUMENTS

| | | |
|---|---|---|
| 2010/0039080 A1 | 2/2010 | Schoenbauer et al. |
| 2010/0231189 A1 | 9/2010 | Chen et al. |
| 2011/0156685 A1 | 6/2011 | Chen et al. |
| 2011/0227550 A1 | 9/2011 | Walters et al. |
| 2012/0146594 A1 | 6/2012 | Kobayashi |
| 2012/0229110 A1 | 9/2012 | Huang et al. |
| 2013/0070796 A1 | 3/2013 | Belloni et al. |

\* cited by examiner

Related Art

Boost mode(Vin<<Vout)

1000

2000

3000

BUCK-BOOST CONVERTER AND OPERATING METHOD

CROSS-REFERENCE TO RELATED APPLICATION

This application claims priority under 35 U.S.C. §119 to Korean Patent Application No. 10-2014-0070139 filed on Jun. 10, 2014, the subject matter of which is hereby incorporated by reference.

BACKGROUND

The inventive concept relates to buck-boost converters and related operating methods.

Many contemporary electronic devices require one or more constant operating voltage(s) in order to function properly. Thus, the provision of a voltage controller capable of maintaining a constant voltage has become a material design consideration in many electronic devices. There are different kinds of voltage controllers. However, one important class of circuits used to control one or more operating voltages is known as the "buck-boost converter".

The buck-boost converter is essentially a direct current to direct current (DC-to-DC) converter that receives an input voltage and fixes a corresponding output voltage to a given reference voltage. If the input voltage is less than the reference voltage, the buck-boost converter operates as a "boost converter" to boost (i.e., increase) the input voltage, and if the input voltage is greater than the reference voltage, the buck-boost converter operates as a "buck-converter" to buck (i.e., decrease) the input voltage.

SUMMARY

According to one aspect of the inventive concept, a buck-boost converter configured to operate in a buck mode and a boost mode includes; a first reactive element being selectively connected/disconnected to an input node receiving an input voltage by a switching unit, wherein when connected to the input node the first reactive element stores reactive energy and when disconnected from the input node the first reactive element transfers stored reactive energy to an output node; and a second reactive element connected between the output node and a ground node, wherein the second reactive element stores the reactive energy received from the first reactive element, wherein operation of the switching unit causes the buck-boost converter to operate in the buck mode during a buck mode operating stage and boost mode during a boost mode operating stage, the buck mode operating stage and the boost mode operating stage overlapping at least in part, and The boost mode operating stage including, in response to at least one switching operation performed by the switching unit, a first time period during which a first decreasing rate of current flowing from the first reactive element having a first slope is apparent at the output node and a second time period during which a second decreasing rate of current, different from the first decreasing rate of current, flowing from the first reactive element having a second slope is apparent at the output node.

According to another aspect of the inventive concept a method of operating a buck-boost converter including an inductor and a capacitor includes; performing a first switching operation in a switching unit to cause the buck-boost converter to operate in a first boost mode during a first boost mode operating stage during which an input voltage applied to the buck-boost converter is less than an output voltage provided by the buck-boost converter, performing a second switching operation in the switching unit to cause the buck-boost converter to operate in a second boost mode during a second boost mode operating stage beginning when the input voltage exceeds the output voltage and ending when the input voltage reaches a predetermined voltage level greater than the output voltage, and performing a second switching operation in the switching unit to cause the buck-boost converter to operate in a buck mode during a third operating stage during which the level of the input voltage is greater higher than the predetermined voltage level, wherein during the first boost mode operating stage, a first decreasing rate of current flowing from the first reactive element having a first slope is apparent at the output node and then a second decreasing rate of current different from the first decreasing rate of current flowing from the first reactive element having a second slope is apparent at the output node.

According to still another aspect of the inventive concept, a method of operating a buck-boost converter including an inductor and a capacitor includes; operating the buck-boost converter in boost mode until a level of an input voltage applied at an input node of the buck-boost converter reaches a desired level of an output voltage apparent at an output node of the buck-boost converter, after the level of an input voltage reaches the desired level of the output voltage, operating the buck-boost converter in buck mode, wherein operating the buck-boost converter in buck mode and operating the buck-boost converter in boost mode overlap at least in part temporally proximate a point at which the level of the input voltage exceeds the level of the output voltage.

BRIEF DESCRIPTION OF THE DRAWINGS

The above and other features and advantages of the inventive concept will become more apparent to those skilled in the art upon consideration of certain embodiments illustrated in the following drawings in which.

DETAILED DESCRIPTION

Figure 1:
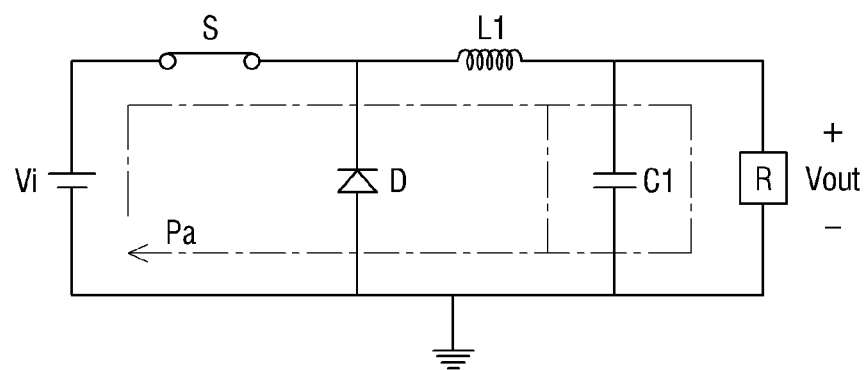
FIGS. 1 and 2 are circuit diagrams illustrating the operation of a buck converter.

Certain embodiments of the inventive concept will now be described in some additional detail with reference to the accompanying drawings. The inventive concept may, however, be embodied in many different forms and should not be construed as being limited to only the illustrated embodiments. Rather, these embodiments are provided so that the present disclosure will be thorough and complete, and will fully convey the scope of the inventive concept to those skilled in the art. Throughout the written description and drawings, like reference numbers are used to denote like or similar elements.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the present disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which the present disclosure belongs.

Embodiments of the inventive concept variously provide buck-boost converters having an improved conversion efficiency by reducing an average inductor current level while preventing an output ripple due to a residual inductor current in circumstances when the buck-boost converter operates in boost mode. Embodiments of the inventive concept also variously provide methods of operating a buck-boost converter that provides increased conversion efficiency by reducing the average inductor current level while preventing an output ripple due to a residual inductor current in circumstances when the buck-boost converter operates in boost mode.

Consistent with the foregoing discussion, when the input voltage of a buck-boost converter is less than a desired output voltage, the buck-boost converter operates in "boost mode" to increase the level of the input voltage until the input voltage is substantially equal to the output voltage. Conventionally, a problem associated with oscillation in a variable frequency mode or a fixed frequency mode may occur due to insufficient capacity of a supply current. In addition, a voltage ripple of the output voltage may be increased due to a residual inductor current, and the efficiency of the buck-boost converter may be reduced due to a switching operation performed in the presence of the residual inductor current.

Figure 2:
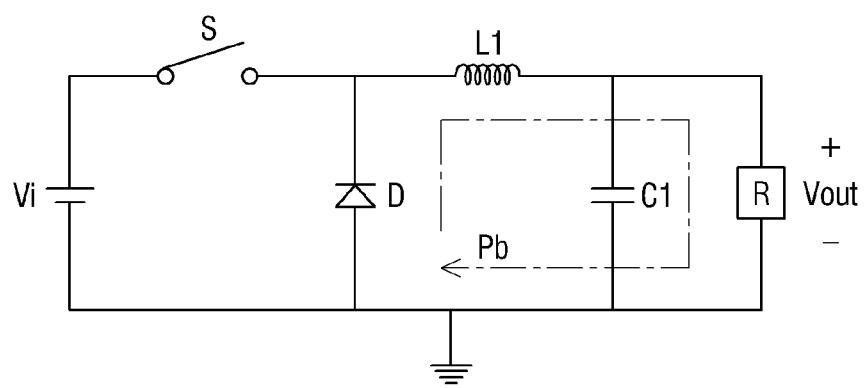

FIGS. 1 and 2 are respective circuit diagrams illustrating operation of a buck converter configured as a step-down converter of the type having an input terminal and output terminal sharing a ground terminal. Using a switching device to periodically generate ON and OFF states, an input voltage is connected to the buck converter during the ON state, but disconnected during the OFF state. In this manner, the periodic ON/OFF states create a pulsed input voltage that is averaged through an inductor (L) and capacitor (C) (an LC filter) to provide and controlled DC output voltage.

Referring to FIGS. 1 and 2, the buck converter uses a switch S and a diode D to control application of an input voltage provided by a voltage source Vi to the inductor L1. In this manner, the buck converter may repeatedly store "inductance energy" in the inductor L1 by variably connecting/disconnecting the inductor L1 to the voltage source Vi and then discharge the stored inductance energy to a load R. Here, it is assumed that the load R is connected across an output node Vout.

FIG. 1 illustrates the ON state of the buck converter. During the ON state, a first current path Pa may be created and current through the inductor L1 increases linearly. Since a reverse voltage is applied to the diode D by the voltage source Vi, current will not flow through the diode D. Thus, during the ON state, the inductance energy stored by the inductor L1 increases.

FIG. 2 illustrates the OFF state of the buck converter. During the OFF state, a second current path Pb is created and a forward voltage is applied to the diode D. Thus, during the OFF state, the inductance energy developed by the inductor L1 is transferred to the load R (i.e., the output terminal Vout).

Figure 3:
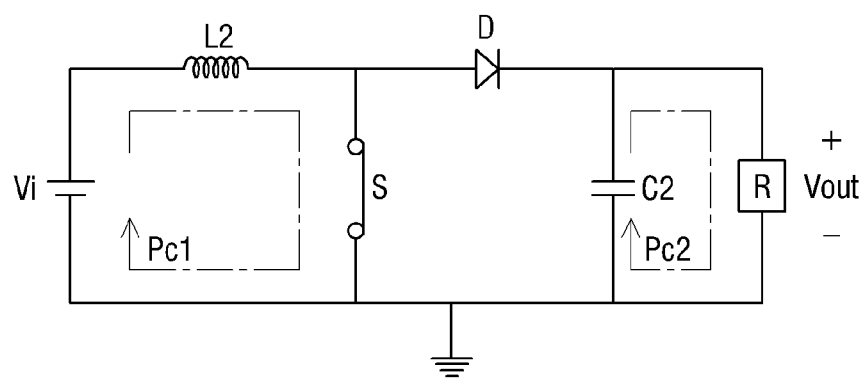
FIGS. 3 and 4 are circuit diagrams illustrating the operation of a boost converter.
Figure 4:
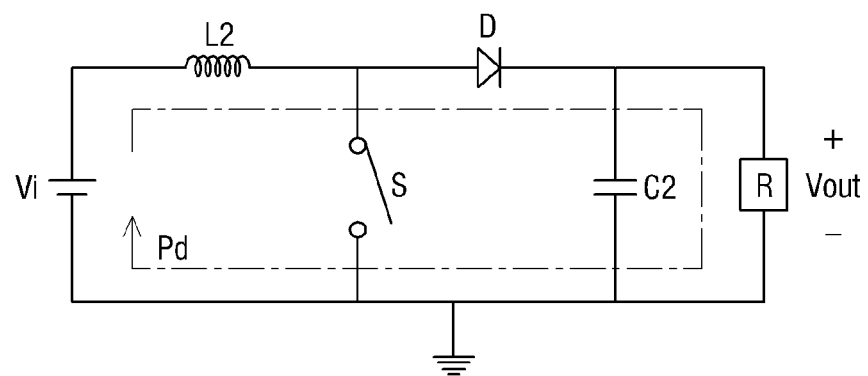

FIGS. 3 and 4 are respective circuit diagrams further illustrating the operation of a boost converter configured as a step-up converter of the type having an input terminal and output terminal sharing a ground terminal. Using a switch S to periodically create alternating ON/OFF states, input power is connected to the circuit during the ON state in order to develop inductance energy in (i.e., charge) the inductor. Then during the OFF state the inductance energy is transferred to the load R.

Referring to FIGS. 3 and 4, the boost converter again uses a switch S and diode D to connect/disconnect the input voltage provided by the voltage source Vi to the inductor L2. The buck converter repeatedly stores inductance energy in the inductor L2 during ON states and discharges the inductance energy stored in the inductor L2 to the load R or output node Vo during OFF states.

FIG. 3 illustrates the ON state of the buck converter. During the ON state, first and second current paths Pc1 and Pc2 are created and current passing through the inductor L2 increases linearly. Since a reverse voltage is applied to the diode D in this state, current will not flow through the diode D, and the inductance energy stored in the inductor L2 increases.

FIG. 4 illustrates the OFF state of the buck converter. In the OFF state, a third current path Pd is created and a forward voltage may be applied to the diode D. Thus, in OFF state, the inductor L2 transfer inductance energy to the load R (i.e., output terminal Vout).

With this descriptive context in place, certain embodiments of the inventive concept will now be described.

Figure 5:
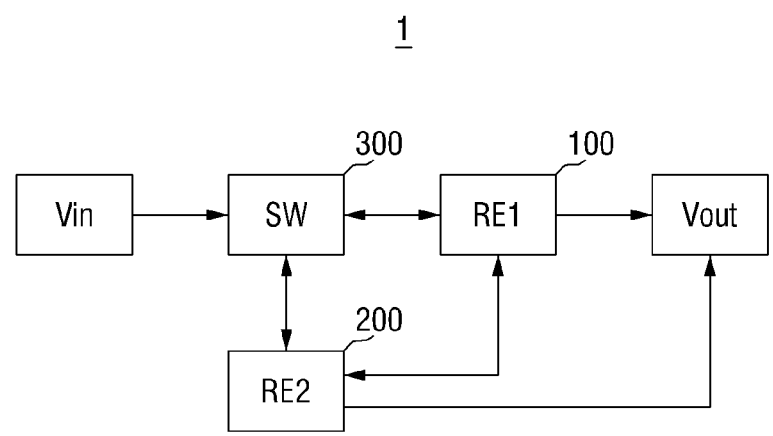
FIG. 5 is a block diagram illustrating a buck-boost converter according to an embodiment of the inventive concept.
Figure 6:
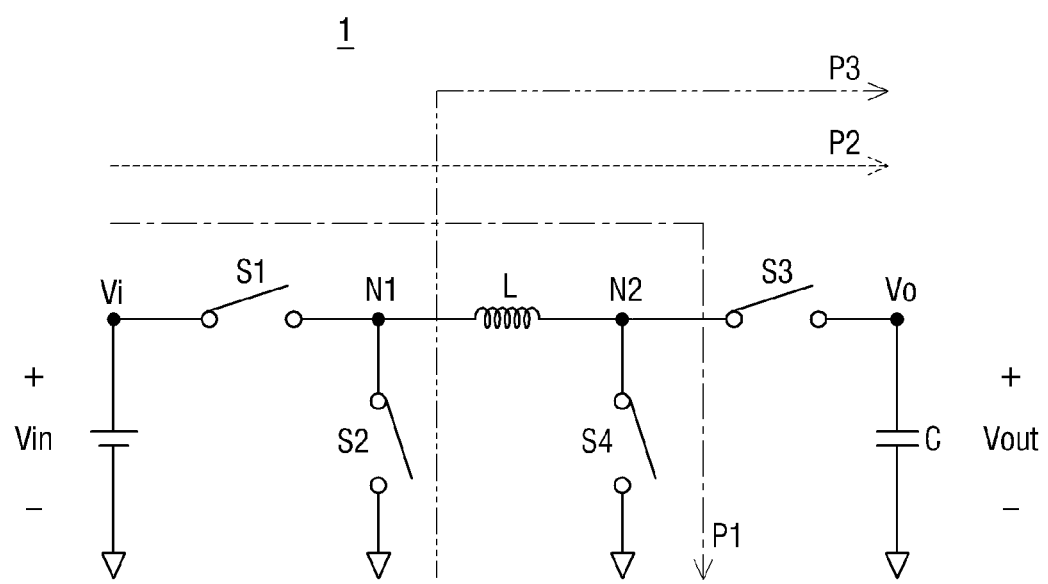
FIG. 6 is a circuit diagram illustrating a buck-boost converter according to an embodiment of the inventive concept.
Figure 7:
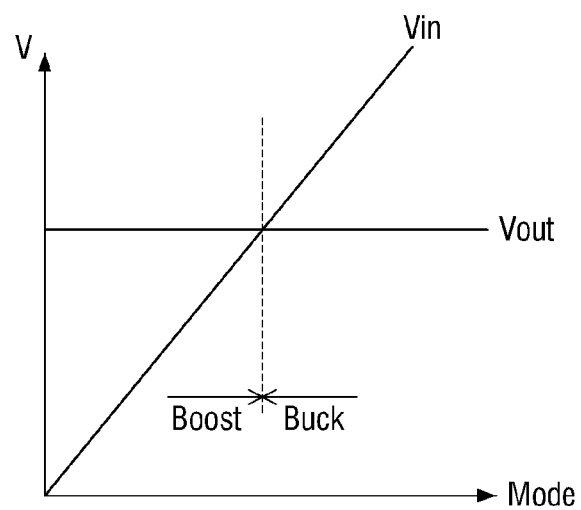
FIGS. 7 and 8 are respective graphs illustrating a frequency variable mode operating range for a buck-boost converter according to certain embodiments of the inventive concept.
Figure 8:
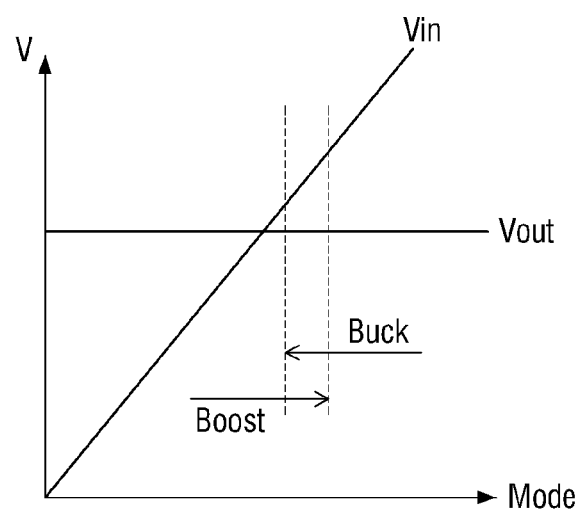

FIG. 5 is a block diagram of a buck-boost converter according to an embodiment of the inventive concept and FIG. 6 is a corresponding circuit diagram. FIGS. 7 and 8 are respective graphs illustrating a frequency variable mode operating range of a buck-boost converter according to certain embodiments of the inventive concept.

Referring to FIG. 5, a buck-boost converter 1 comprises a first reactive element 100, a second reactive element 200 and a switching unit 300.

The first reactive element 100 is connected between an input node receiving an input voltage Vin and an output node providing an output voltage Vout. In certain operating states (or modes) the first reactive element 100 will transfer "reactive energy" to the output node Vout. In certain embodiments, the first reactive element 100 may be one or more inductor(s), but need not necessarily be an inductor. Thus, the first reactive element 100 is selectively connected to the input voltage Vin apparent at an input terminal according to the operation of the switching unit 300.

When the buck-boost converter 1 operates in either the buck mode or boost mode, the first reactive element 100 may be used to store reactive energy and transfer the reactive energy to an output node to generate the output voltage Vout. When the switching unit 300 is operated to define an ON state, current flow through the first reactive element 100 and the first reactive element 100 store reactive energy. And when the switching unit 300 is operated to define an OFF state, the first reactive element 100 transfers the stored reactive energy to the output node.

The second reactive element 200 is connected between the output node and a ground terminal in order to store the reactive energy transferred from the first reactive element 100. Here, the second reactive element 200 may be one or more capacitors, for example. The second reactive element 200 is connected to the first reactive element 100 according to the operation of the switching unit 300, such that it may receive and store reactive energy provided by the first reactive element 100.

The switching unit 300 controls the charging/discharging of the first reactive element 100 and second reactive element 200 in order to cause the buck-boost converter 1 to operate in buck mode or boost mode. The switching unit 300 may include, for example, one or more switching device(s) (e.g., switch(es), diode(s), metal oxide semiconductor (MOS) transistor(s), etc.).

The operation of the buck-boost converter 1 of FIG. 5 is further described in the context of FIG. 6. FIG. 6 illustrates a specific case wherein the switching unit 300 includes four (4) switches (S1, S2, S3 and S4), but this is just one example of many possible embodiments of the inventive concept.

Thus, the buck-boost converter 1 shown in FIG. 6 includes first, second, third and fourth switches S1, S2, S3 and S4, an inductor L, and a capacitor C. In order to increase the conversion efficiency in a variable frequency mode, the buck-boost converter 1 may operate in the buck mode or the boost mode according to the states of the input voltage Vin and the output voltage Vout. That is to say, the buck-boost converter 1 operate in a variable frequency mode when the input voltage Vin is greater than the output voltage Vout, and when the when the input voltage Vin is less than the output voltage Vout.

Accordingly, when the buck-boost converter 1 operates in buck mode, switching operations for the first, second and third switching devices S1, S2 and S3 are repeatedly performed to allow current to flow through a second current path P2 and a third current path P3. And when the output voltage Vout reaches a given reference level, the first, second, third and fourth switching devices S1, S2, S3 and S4 are operated to define an OFF state.

In addition, when the buck-boost converter 1 operates in boost mode, switching operations of the first switching device S1, third switching device S3 and fourth switching device S4 are repeatedly performed to enable current to flow through the first and second current paths P1 and P2, but when the output voltage Vout reaches the reference level, the first, second, third and fourth switching devices S1, S2, S3 and S4 are operated to define the OFF state.

In this regard during the boost mode, the second switching device S2 may be operated to enable current to flow through the third current path P3 before the operating mode switches from the boost mode to the buck mode. Here, the second switching device S2 may perform a switching operation just once.

In addition, the switching operations of the first, second, third and fourth switching devices S1, S2, S3 and S4 may be controlled to operate in boost mode during a preliminary operating stage during which the input voltage Vin is greater than the output voltage Vout. FIG. 7 shows a comparative example of a buck mode operating stage and a boost mode operating stage for a conventional buck-boost converter, while FIG. 8 shows a buck mode operating stage and a boost mode operating stage according to certain embodiments of the inventive concept.

Thus, for the buck-boost converter 1 at least some portion of the buck mode operating stage and boost mode operating stage will overlap. In particular, the overlapping operating stages may exist in a region where the input voltage Vin is greater than the output voltage Vout. And the boost mode operating stage for the buck-boost converter 1 include circumstances wherein a decreasing rate of current from the inductor L to the output node Vo changes from a first slope to a second slope.

Thus, the buck-boost converter 1 operates in the boost mode when the input voltage Vin is less than the output voltage Vout, and when the input voltage Vin is slightly greater than the output voltage Vout after passing an equilibrium point when the input voltage Vin and output voltage Vout are equal. As a result of this operating approach, the conventional uncertainty between operating in the buck mode or boost mode at the equilibrium point can be eliminated. Further, the increase in output voltage Vout ripple that unavoidably occurs in conventional buck-boost converters when the input voltage Vin is slightly less than the output voltage Vout may be effectively suppressed. In addition, since the buck-boost converter according to certain embodiments of the inventive concept operate in the boost mode when the input voltage Vin is slightly greater than the output voltage Vout, the drive capability of the buck-boost converter need not be reduced due to premature buck mode operation.

Figure 9:
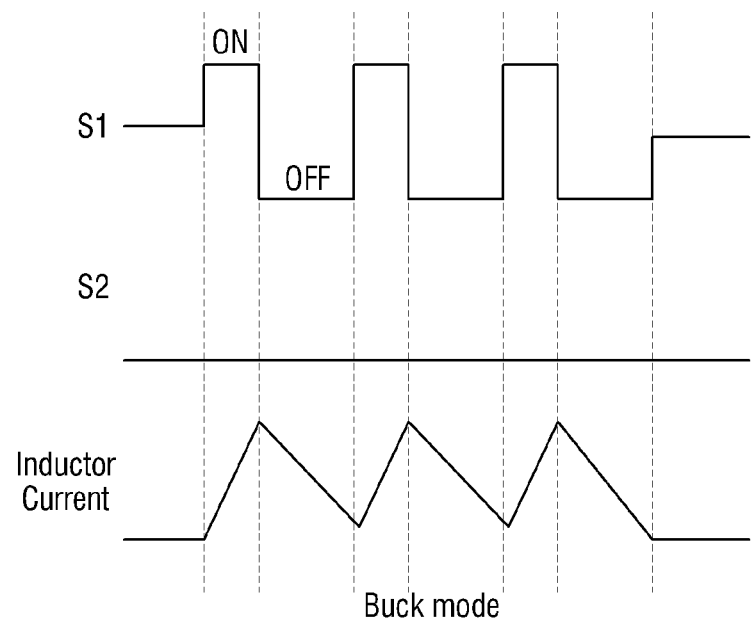
FIGS. 9, 10, 11, 12, 13 and 14 are respective graphs illustrating variations in the inductor current of a buck-boost converter according to various embodiments of the inventive concept.
Figure 10:
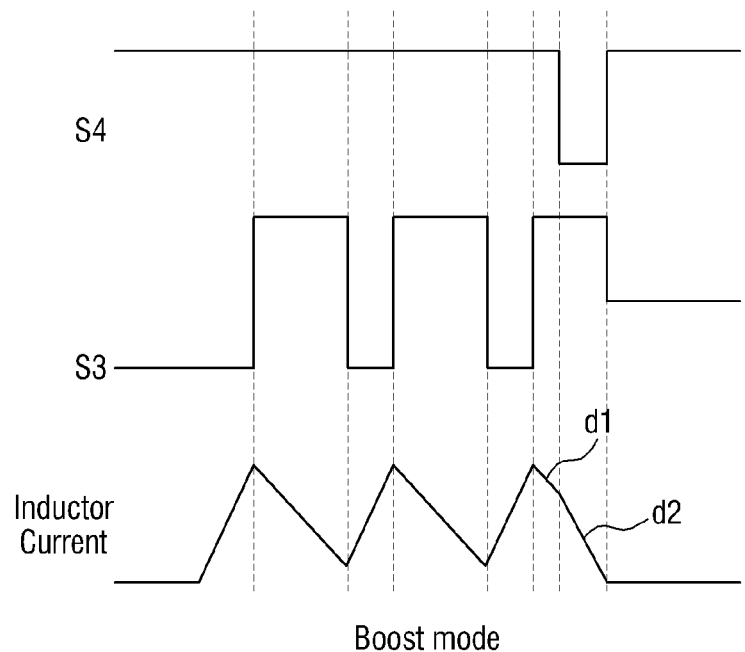
Figure 11:
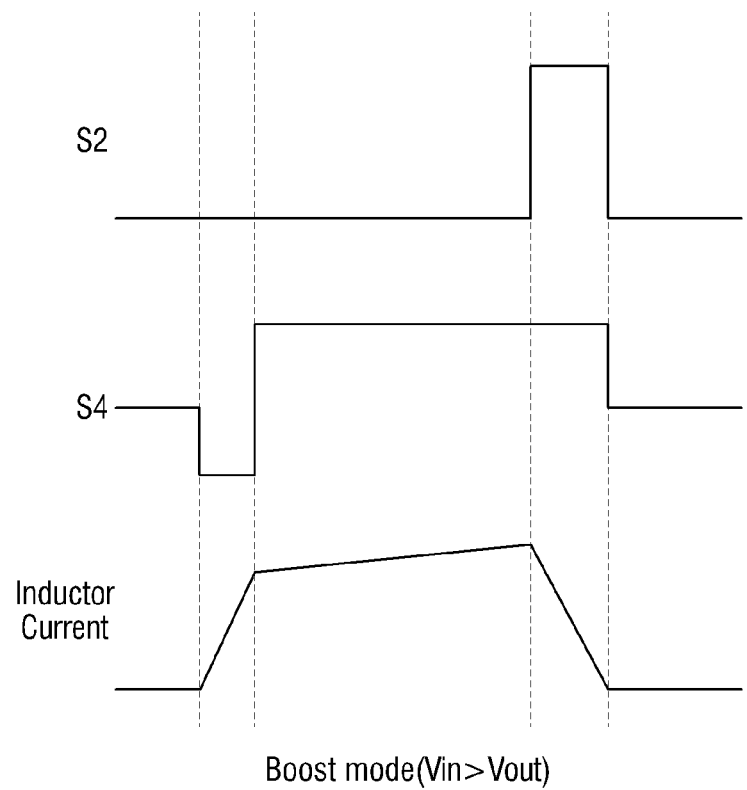

FIGS. 9, 10 and 11 are respective graphs illustrating variation in inductor current for a buck-boost converter according to an embodiment of the inventive concept. In the following description, a high level refers to the ON state and a low level refers to the OFF state.

FIG. 9 illustrates variation in the inductor current during the buck mode. That is, when the level of the input voltage Vin is greater than the level of the output voltage Vout, the buck-boost converter 1 operates in the buck mode and the first switching device S1 is ON, so that the inductor L is connected to input power in order to apply the input voltage Vin. As the input voltage Vin is applied to the inductor L, reactive energy is stored in the inductor L. In addition, as the first switching device S1 is switched OFF, the inductor current decreases and the reactive energy stored in the inductor L is transferred to the capacitor C connected across the output node Vo.

FIG. 10 illustrates variation in the inductor current during the boost mode. That is, when the input voltage Vin is less than the output voltage Vout, the buck-boost converter 1 operate in the boost mode and the third switching device S3 is ON, the inductor current may decrease, and the energy stored in the inductor L may be transferred to the capacitor C connected across the output node Vo. In addition, as the third switching device S3 is switched OFF, the inductor current may increase and the reactive energy stored in the inductor L will also increase. Here, the rate at which the inductor current decreases may instantaneously change from a first slope d1 to a second slope d2 due to the switching OFF of the fourth switching device S4. Thus, in certain embodiments of the inventive concept a buck-boost converter operates in response to a change in the rate of decreasing inductor current (e.g., as between first slope d1 and second slope d2).

FIG. 11 illustrates variation in inductor current during the boost mode, and specifically variation in the current of the inductor L of the buck-boost converter 1 operating in boost mode during a preliminary reactive element charging stage when the input voltage Vin is greater than the output voltage Vout. In FIG. 11, when the second switching device S2 and fourth switching device S4 are OFF, the first switching device S1 and third switching device S3 may be maintained ON, such that the reactive energy is stored in the inductor L, the inductor current increases and the fourth switching device S4 is switched ON, thereby further increasing the inductor current due to the current flowing through the first current path P1. Then, as the second switching device S2 is switched ON, the inductor current instantaneously decreases.

After the switching operation shown in FIG. 11, the boost mode may be converted into buck mode. That is, when the boost mode is converted to buck mode following the preliminary reactive element charging stage when the input voltage Vin is greater than the output voltage Vout, the buck-boost converter 1 need only switch the second switching device S2 once. Accordingly, conversion between boost mode and buck mode may be readily facilitated and a conversion efficiency of the buck-boost converter improved.

Figure 12:
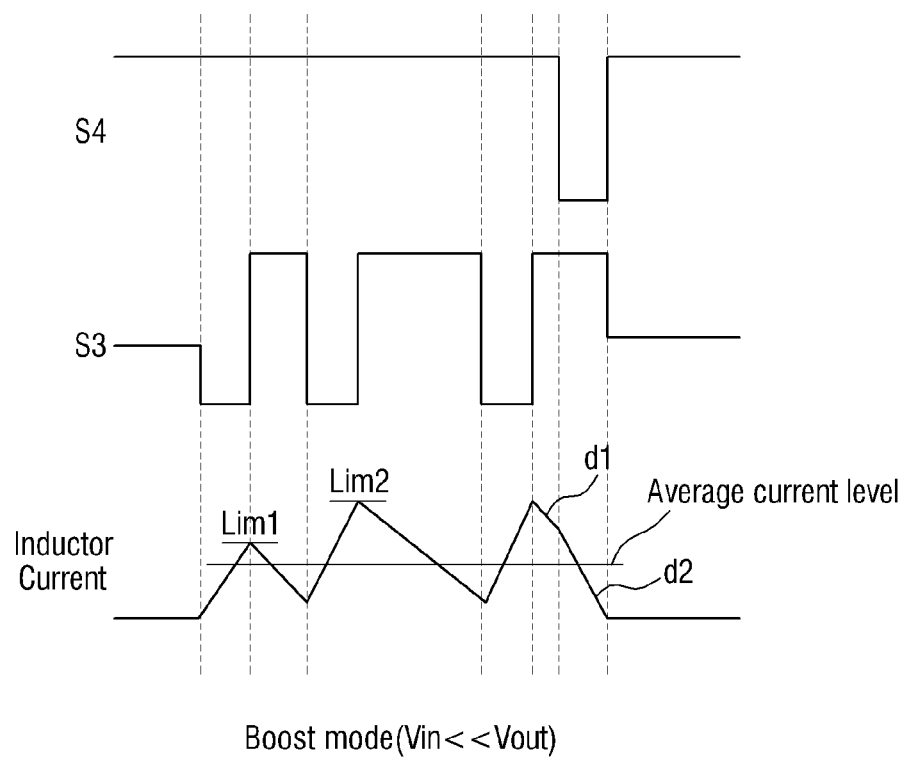
Figure 13:
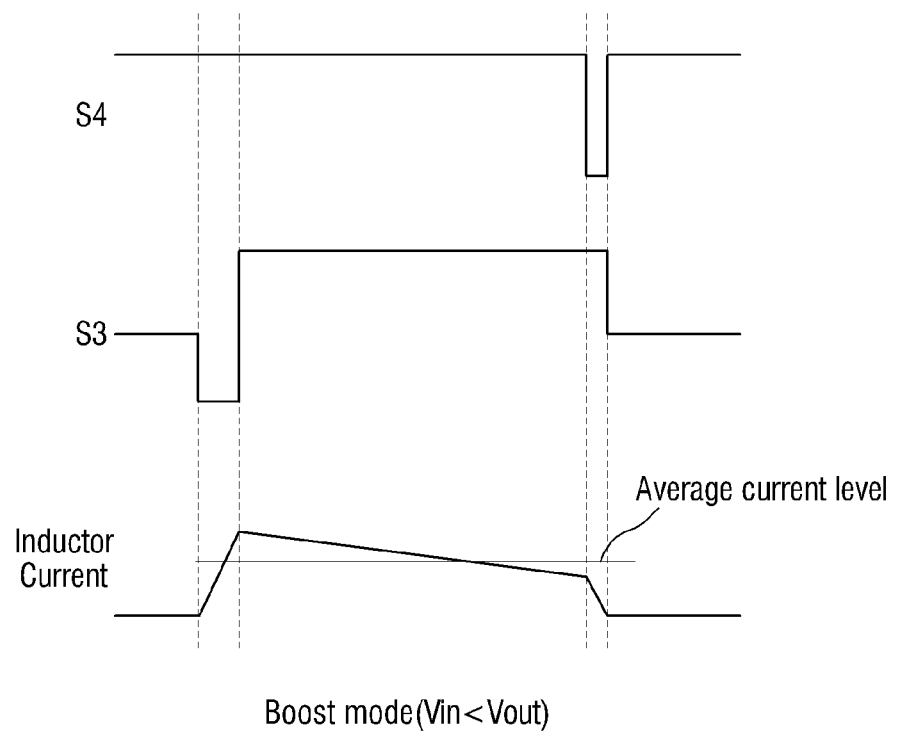
Figure 14:
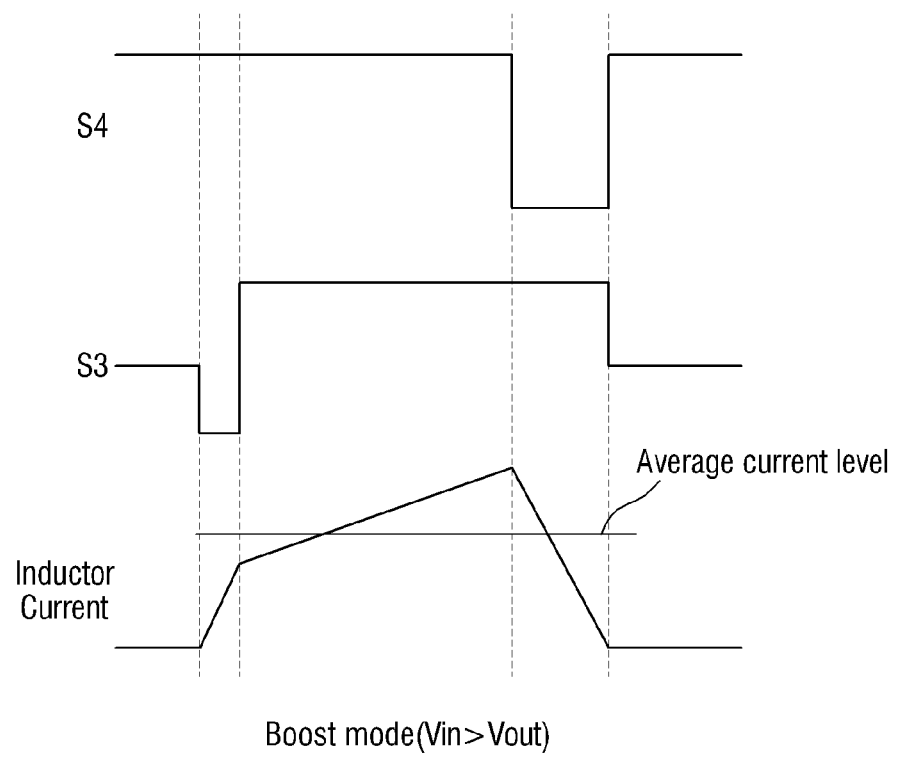

FIGS. 12, 13 and 14 are respective graphs illustrating variation in the inductor current of a buck-boost converter according to certain embodiments of the inventive concept.

Referring to FIG. 12, during an operating stage in which a buck-boost converter according to an embodiment of the inventive concept operates in boost mode, a first current limit level Lim1 among a plurality of current limit levels for the inductor L is set to a minimum. That is, as shown in FIG. 12, during the boost mode where the input voltage Vin is less than the output voltage Vout, an average current level for the inductor L may be reduced by setting a first current limit value Lim1 of the current flowing through the inductor L. Accordingly, when the input voltage Vin is substantially equal to the output voltage Vout or when the input voltage Vin becomes greater than the output voltage Vout, a change in the boost mode operating characteristics can be minimized and the boost mode operating efficiency can be improved. In addition, it is possible to prevent increased ripples of the output voltage Vout. A second current limit value Lim2 may be set to be higher than the first current limit value Lim1. In FIG. 12, Vin<<Vout indicates a starting point for boost mode operation.

During the boost mode when the input voltage Vin is less than the output voltage Vout, in order to set the first current limit level Lim1 of the current flowing through the inductor L to a minimum, the third switching device S3 may be repeatedly switched where the ON time of the third switching device S3 is not fixed.

FIGS. 13 and 14 are respective graphs illustrating variation in the inductor current of a buck-boost converter according to an embodiment of the inventive concept. Specifically, FIG. 13 illustrates a variation in the current of the inductor L during an operating stage wherein the input voltage Vin is less than output voltage Vout immediately before the input voltage Vin becomes substantially equal to the output voltage Vout. FIG. 14 illustrates a variation in the current of the inductor L during an operating stage wherein the input voltage Vin is greater than the output voltage Vout after a point at which the input voltage Vin becomes substantially equal to the output voltage Vout.

Referring to FIG. 13, when the third switching device S3 is OFF, the current of the inductor L is allowed to flow through the first current path P1, thereby increasing the inductor current. In addition, when the third switching device S3 is ON, since the input voltage Vin is less than the output voltage Vout, the flow of current through the inductor L reverses and decreases. As the fourth switching device S4 is switched OFF, the inductor current flowing from the input node Vi to the output node Vo becomes 0.

Referring to FIG. 14, when the third switching device S3 is OFF, the current of the inductor L is allowed to flow through the first current path P1, thereby increasing the inductor current. In addition, when the third switching device S3 is ON, since the input voltage Vin is greater than the output voltage Vout, the current flowing through the inductor L from the input node Vi to the output node Vo increases, and an inductor current increasing decreases. As the fourth switching device S4 is switched OFF, the inductor current flowing from the input node Vi to the output node Vo becomes 0.

Figure 15:
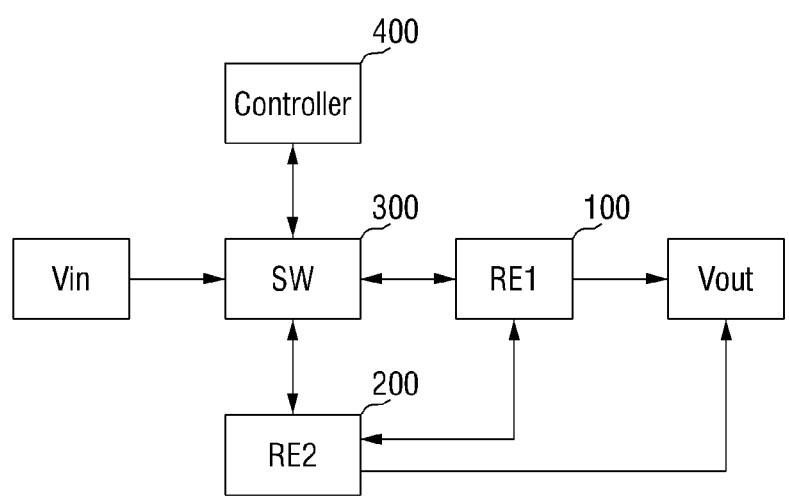
FIGS. 15 and 16 are respective block diagrams illustrating buck-boost converters according to various embodiments of the inventive concept.

FIG. 15 is a block diagram illustrating a buck-boost converter according to another embodiment of the inventive concept.

Referring to FIG. 15, a buck-boost converter 3 comprises; a first reactive element 100, a second reactive element 200, a switching unit 300, and a controller 400.

The first reactive element 100, second reactive element 200 and switching unit 300 are substantially the same as those previously described.

The controller 400 may be sued to control the switching operation of the switching unit 300. That is, the switching operation of the switching unit 300 may be controlled in order to allow the buck-boost converter 3 to operate in buck mode or boost mode based on the conditions of the input voltage Vin and/or the output voltage Vout. In addition, the respective operations of the constituent switching devices of the switching unit 300 may be appropriately controlled, thereby automatically performing the switching operations described above in relation to various embodiments.

Figure 16:
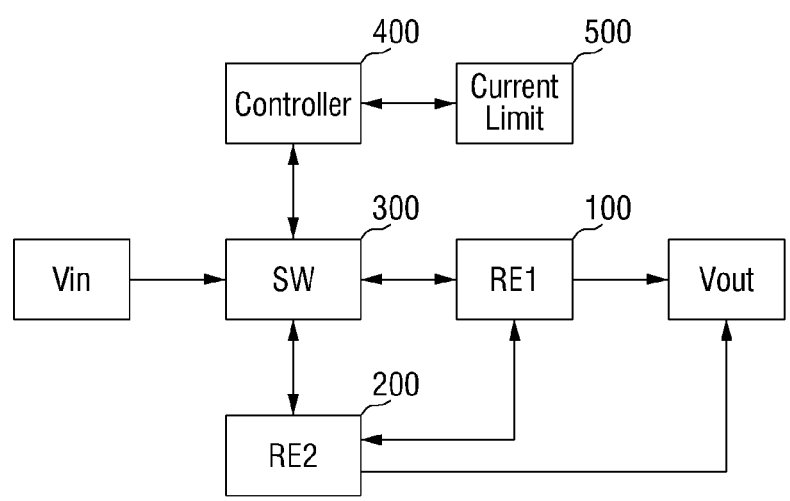

FIG. 16 is a block diagram illustrating a buck-boost converter according to still another embodiment of the inventive concept.

Referring to FIG. 16, a buck-boost converter 4 comprises; a first reactive element 100, a second reactive element 200, a switching unit 300, a controller 400, and a current limit setting unit 500. The first reactive element 100, second reactive element 200, switching unit 300 and controller 400 are substantially the same as those of the previous embodiments.

During an operating stage where the buck-boost converter 4 operates in the boost mode, a first current limit level Lim1 among a plurality of current limit levels of the inductor L may be set to a minimum. (See, FIG. 12). That is, during the boost mode where the input voltage Vin is less than the output voltage Vout, an average current level of the inductor L may be reduced by setting a first current limit value Lim1 of the current flowing through the inductor L. In this manner, the controller 400 may appropriately control the switching operation of the switching unit 300. If the current limit setting unit 500 sets a first current limit value Lim1 of the current flowing through the inductor L, a switch-on time of the switching unit 300 may be adjusted so as to prevent the inductor current from exceeding the first current limit value Lim1. It is possible to prevent output voltage Vout ripples from increasing by reducing the current level of the inductor L at a time when reactive energy is discharged after charging the inductor L for the first time.

Figure 17:
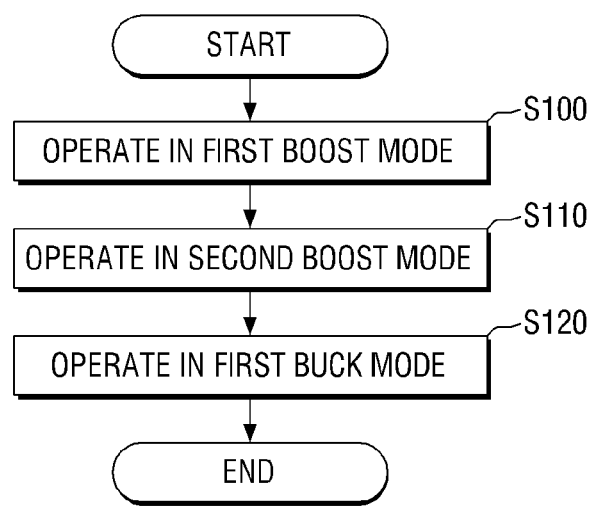
FIGS. 17 and 18 are respective flowcharts summarizing methods of operating a buck-boost converter according to various embodiments of the inventive concept.

FIG. 17 is a flowchart summarizing a method of operating a buck-boost converter according to an embodiment of the inventive concept. Referring to FIG. 17, the operating method for the buck-boost converter includes switching appropriate switching elements to initially (first) operate in boost mode during a time period wherein the input voltage is less than the output voltage (S100). This boost mode operating period may be referred to as a "first stage" of operation. During the first boost mode at least one reactive element is repeatedly charged/discharged through a plurality of aperiodic switching operations, such as the those shown for example in FIG. 12.

During the first boost node operating stage of an operating method for a buck-boost converter according to an embodiment of the inventive concept, a switching operation may be performed to change a decreasing rate of the current flowing through at least one reactive element (e.g., an inductor) to effective change a first slope for the rate of current to a different, second slope. In particular, the switching operation may be performed once in order to have one current decreasing rate changing stage wherein the reactive element current decreasing rate changes from the first slope to the second slope.

In the first boost mode operating stage, a first current limit level Lim1 among a plurality of current limit levels of the inductor L may be set to a minimum so that the development of output voltage ripples may be avoided while also improving the efficiency of the buck-boost converter.

In addition, the setting of the first current limit level Lim1 among the plurality of current limit levels of the inductor L to a minimum can be achieved by providing a plurality of switching operations in the first boost mode operating stage and minimizing a switch-ON time for a first switching operation among the plurality of switching operations.

Next, another switching operation may be performed to cause the buck-boost converter to operate in a second boost mode during a second stage beginning at a point in time where the input voltage rises above the output voltage and ending at another point in time where the input voltage reaches a fixed voltage level FV above the output voltage (S110).

Thus, the second boost stage ranges from a point at which the input voltage is substantially equal to the output voltage to a point at which the input voltage reaches a fixed voltage level FV above than the output voltage. As a result, even after the input voltage exceeds the output voltage, a buck-boost converter according to embodiments of the inventive concept will continue to operate in a boost mode.

From the second boost mode a buck-boost converter consistent with embodiments of the inventive concept may transition to the buck mode. That is, a switching operation may be performed when the input voltage is greater than the output voltage, as shown for example in FIG. 14.

Next, a switching operation may be performed to operate in a buck mode during a third stage wherein the input voltage reaches the fixed voltage level FV greater than the output voltage (S120).

Thus, the third stage is characterized by the input voltage being at the fixed voltage level FV greater than the output voltage, such that the buck-boost converter operates in buck mode, as shown for example in FIG. 8. As previously noted, portions of the buck mode operating stage and boost mode operating stage will overlap, thereby eliminating the uncertainty of selecting between the buck mode or boost mode around the time at which the input voltage Vin becomes substantially equal to the output voltage Vout.

Figure 18:
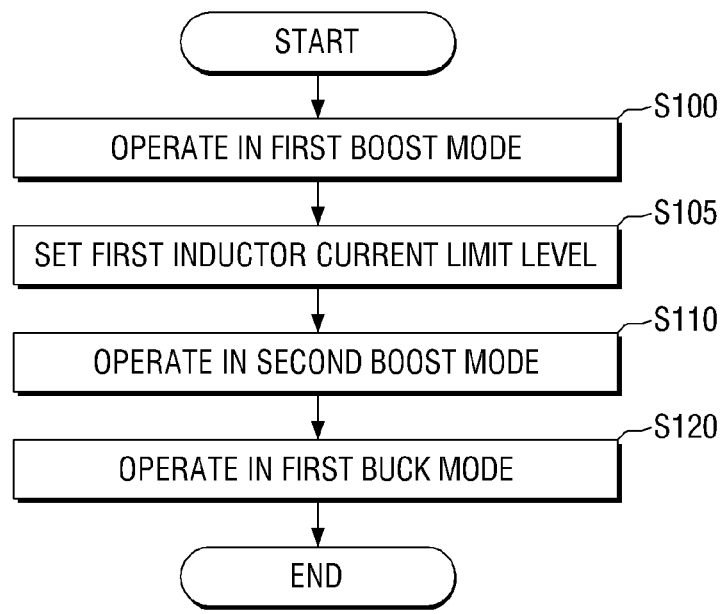

FIG. 18 is a flowchart summarizing another method of operating a buck-boost converter according to certain embodiments of the inventive concept.

Referring to FIG. 18, the operating method for the buck-boost converter includes switching appropriate switching elements to cause the buck-boost converter to operate in a first boost mode in a first stage during which the input voltage is less than an output voltage (S100).

Next, during the first boost mode operating stage, a first current limit level among a plurality of current limit levels of the inductor may be set to a minimum (S105). Here, the first current limit level may be automatically set by a current limit setting unit.

Next, another switching operation may be performed to cause the buck-boost converter to operate in a second boost mode in a second stage beginning at a point at which the input voltage becomes greater than the output voltage until a point at which the input voltage reaches a fixed voltage level greater than the output voltage (S110).

Next, another switching operation may be performed to cause the buck-boost converter to operate in a buck mode in a third stage wherein the input voltage reaches the fixed voltage level greater than the output voltage (S120).

Figure 19:
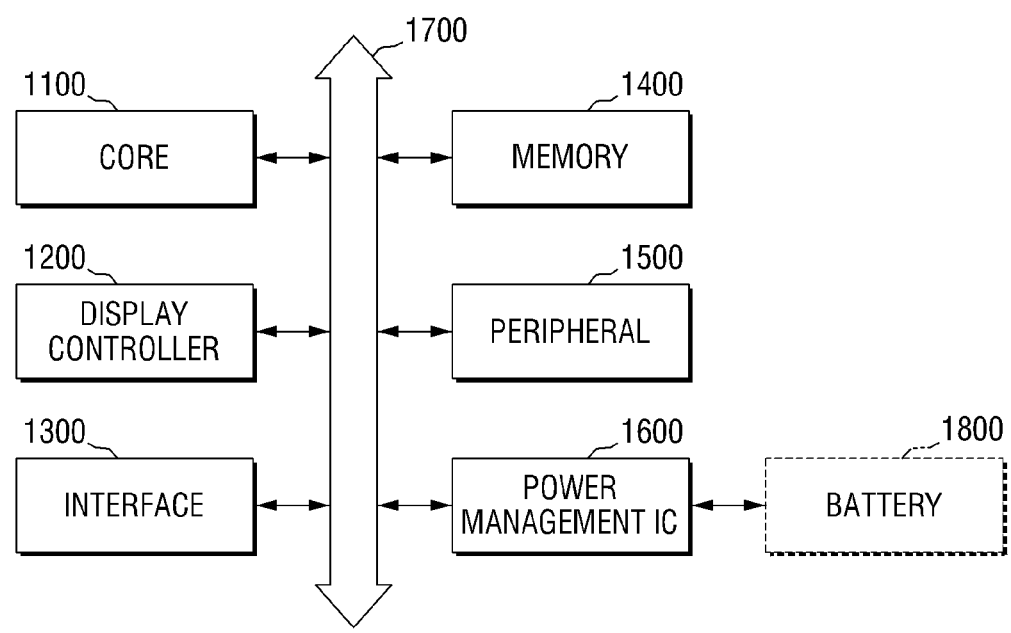
FIG. 19 is a block diagram illustrating a system including a power management device incorporating at least one buck-boost converter according to an embodiment of the inventive concept.

FIG. 19 is a block diagram illustrating a system including a power management device that may incorporate one or more buck-boost converter(s) according to certain embodiments of the inventive concept.

Referring to FIG. 19, the system 1000 comprises a core processor (CORE) 1100, a display controller 1200, an interface device (INTERFACE) 1300, a memory device (MEMORY) 1400, a peripheral device (PERIPHERAL) 1500, and a power management device 1600.

The core processor 1100, the display controller 1200, the interface device 1300, the memory device 1400, the peripheral device 1500 and the power management device 1600 may be connected to each other through a system bus 1700. The system bus 1700 may correspond to a path through which data moves.

The core processor 1100 may include a single core processor or a plurality of cores (multi-core) processors. For example, the core processor 1100 may include a multi-core processor, such as a dual core processor, a quad core processor, or a hexa-core processor. Although not specifically shown in FIG. 19, the core processor 1100 may further include a cache memory positioned inside or outside of the core processor 1100.

The display controller 1200 may be used to control a display device to display a picture or an image.

The interface device 1300 may transmit data to a communication network or may receive data from the communication network. For example, the interface device 1300 may include an antenna or a wired/wireless transceiver.

The memory device 1400 may be configured to store commands and/or data. For example, the memory device 1400 may include a volatile memory device, such as a static random access memory (SRAM) or a dynamic random access memory (DRAM), or a non-volatile memory device, such as a read Only Memory (ROM), an electrically erasable and programmable ROM (EEPROM), or a flash memory, but not limited thereto.

The peripheral device 1500 may include various devices, such as a serial communication device, a memory management device, an audio processor, and so on.

The power management device 1600 may supply power to the core processor 1100, the display controller 1200, the interface device 1300, the memory device 1400 and the peripheral device 1500. The power management device 1600 may be connected to a battery 1800 and may be supplied with a power voltage from the battery 1800.

The power management device 1600 may have built-in buck-boost converters according to embodiments of the inventive concept.

Figure 20:
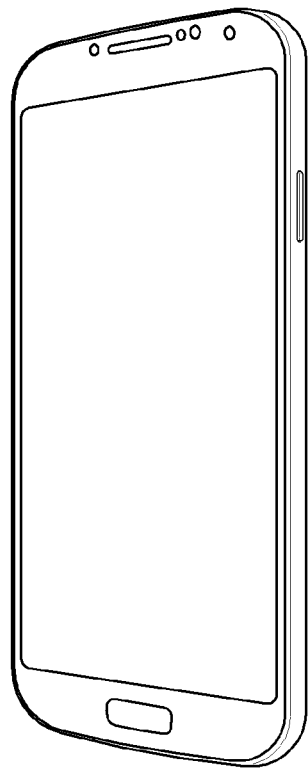
FIGS. 20 and 21 are respective illustrations of electronic devices that may include the system of FIG. 19.
Figure 21:
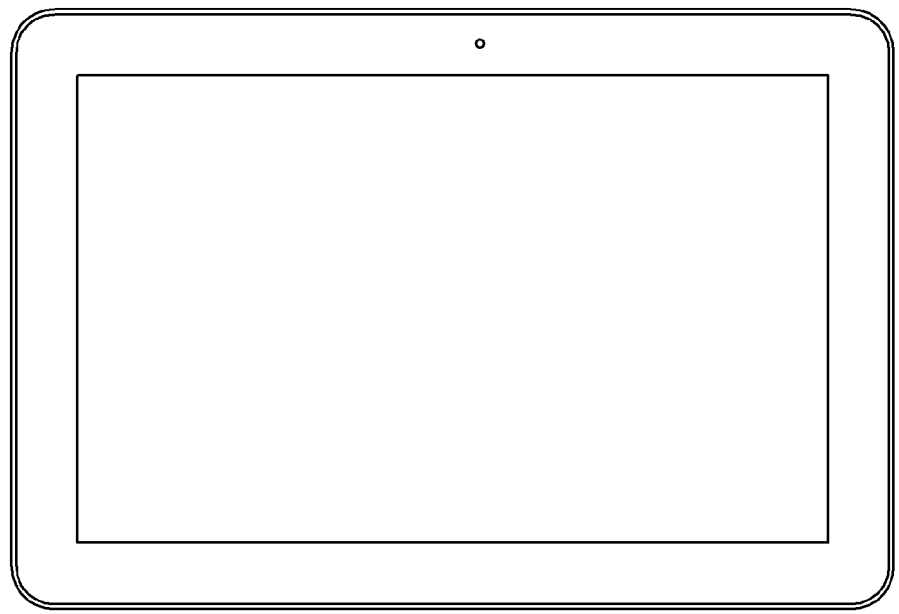

FIGS. 20 and 21 illustrate examples of electronic devices to which the system shown in FIG. 19 is applied. Specifically, FIG. 20 illustrates a smart phone 2000 and FIG. 21 illustrates a tablet PC 3000.

The system 1000 shown in FIG. 19 may be provided as a component (e.g., a system on chip (SOC)) of an arbitrary portable system, such as the smart phone 2000 or the tablet PC 3000.

The system 1000 may be applied to other electronic devices not illustrated herein. For example, the system 1000 may be implemented as a personal computer, an ultra mobile personal computer (UMPC), a work station, a net-book, a personal digital assistant (PDA), a portable computer, a web tablet, a wireless phone, a mobile phone, a smart phone, an e-book, a portable multimedia player (PMP), a potable game console, a navigation device, a black box, a digital camera, a 3-dimensional (3D) television, a digital audio recorder, a digital audio player, a digital picture recorder, a digital picture player, a digital video recorder, a digital video player, a device capable of transmitting/receiving information in wireless environments, one of various electronic devices constituting a home network, one of various electronic devices constituting a computer network, one of various electronic devices constituting a telematics network, RFID devices, or embedded computing systems.

The steps or actions of the method or algorithm described above in connection with the embodiments of the present disclosure may be embodied directly in hardware, in a software module executed by a processor, or in a combination of the two. A software module may reside in a random access memory (RAM), a flash memory, a read-only memory (ROM), an erasable programmable read-only memory (EPROM), an electrically erasable programmable read-only memory (EEPROM), a register, a hard disk, a removable disk, a compact disk read-only memory (CD-ROM), or any other form of storage medium known in the art. An exemplary storage medium may be coupled to the processor, such that the processor can read information from, and write information to, the storage medium. Alternatively, the storage medium may be integral to the processor. Further, in some aspects, the processor and the storage medium may reside in an ASIC. Additionally, the ASIC may reside in a user terminal. The processor and the storage medium may reside as discrete components in a user terminal.

While the present disclosure has been particularly shown and described with reference to exemplary embodiments thereof, it will be understood by those of ordinary skill in the art that various changes in form and details may be made therein without departing from the scope of the following claims.

What is claimed is:

1. A buck-boost converter configured to operate in a buck mode and a boost mode, the buck-boost converter comprising:
   a first reactive element being selectively connected/disconnected to an input node receiving an input voltage by a switching unit, wherein when connected to the input node the first reactive element stores reactive energy and when disconnected from the input node the first reactive element transfers stored reactive energy to an output node;
   a second reactive element connected between the output node and a ground node, wherein the second reactive element stores the reactive energy received from the first reactive element; and
   a first switch controllable, by the switching unit, to be closed for conducting current through the first switch and opened for precluding the conducting current through the first switch, wherein:
   operation of the switching unit causes the buck-boost converter to operate in the buck mode during a buck mode operating stage and boost mode during a boost mode operating stage, the buck mode operating stage and the boost mode operating stage overlapping at least in part,
   the boost mode operating stage including, in response to at least one switching operation performed by the switching unit, a first time period during which a first decreasing rate of current flowing from the first reactive element having a first slope exists and a second time period during which a second decreasing rate of current, different from the first decreasing rate of current, flowing from the first reactive element having a second slope exists, and
   during the first time period, the first and second reactive elements simultaneously conduct currents flowing through the first switch in the same direction without any of the current conducted by the first reactive element flowing through the second reactive element.

2. The buck-boost converter of claim 1, wherein the boost mode operating stage includes a transition point at which a decreasing rate of the current flowing from the first reactive element changes from the first slope to the second slope.

3. The buck-boost converter of claim 1, wherein during the boost mode operating stage, the switching unit is configured to perform a plurality of aperiodic switching operations.

4. The buck-boost converter of claim 3, wherein a corresponding switch-ON time for a first switching operation among the plurality of switching operations is set at a minimum.

5. The buck-boost converter of claim 1, wherein during the boost mode operating stage, a first current limit level among a plurality of current limit levels for the first reactive element is set to a minimum.

6. The buck-boost converter of claim 1, wherein an overlapping period during which the buck mode operating stage and the boost mode operating stage overlap occurs around a time at which the input voltage begins to exceed an output voltage.

7. The buck-boost converter of claim 1, wherein when operation of the buck-boost converter transitions from the boost mode to the buck mode, the switching unit is configured to perform a one-time switching operation.

8. The buck-boost converter of claim 1, wherein the switching unit includes at least one metal oxide semiconductor (MOS) transistor or at least one diode.

9. The buck-boost converter of claim 1, further comprising:
a controller configured to control execution of switching operations performed by the switching unit; and
a current limit setting unit configured to set a current limit value for the current flowing through the first reactive element.

10. The buck-boost converter of claim 1, wherein the first reactive element is an inductor, and the second reactive element is a capacitor.

11. The buck-boost converter of claim 1, wherein the switching unit includes a plurality of switching devices.

12. A method of operating a buck-boost converter including first and second reactive elements, the method comprising:
performing a first switching operation in a switching unit to cause the buck-boost converter to operate in a first boost mode during a first boost mode operating stage during which an input voltage applied to the buck-boost converter is less than an output voltage provided by the buck-boost converter;
performing a second switching operation in the switching unit to cause the buck-boost converter to operate in a second boost mode during a second boost mode operating stage beginning when the input voltage exceeds the output voltage and ending when the input voltage reaches a predetermined voltage level greater than the output voltage; and
performing a third switching operation in the switching unit to cause the buck-boost converter to operate in a buck mode during a third operating stage during which the level of the input voltage is greater than the predetermined voltage level, wherein:
during the first boost mode operating stage, a first decreasing rate of current flowing from the first reactive element having a first slope exists and then a second decreasing rate of current different from the first decreasing rate of current flowing from the first reactive element having a second slope exists, and
during the first boost mode operating stage, the first and second reactive elements simultaneously conduct currents flowing through a first switch of the switching unit in the same direction without any of the current conducted by the first reactive element flowing through the second reactive element.

13. The method of claim 12, wherein the first boost mode operating stage and second boost mode operating stage are separated by a transition point at which a decreasing rate of the current flowing from the first reactive element changes from the first slope to the second slope.

14. The method of claim 12, wherein during the at least one of the first and second boost mode operating stages, the switching unit performs a plurality of aperiodic switching operations.

15. The method of claim 14, wherein a corresponding switch-ON time for a first switching operation among the plurality of switching operations is set at a minimum.

16. The method of claim 12, further comprising:
during the first boost mode operating stage, setting a first current limit level among a plurality of current limit levels for the first reactive element to a minimum.

17. The method of claim 12, wherein the first reactive element is an inductor, and the second reactive element is a capacitor.

18. A buck-boost converter configured to operate in a buck mode and a boost mode, the buck-boost converter comprising:
a first switch directly electrically connected between an input node, which receives a direct current (DC) voltage, and a first node;
a second switch directly electrically connected between the first node and a reference potential;
an inductive element directly electrically connected between the first node and a second node;
a third switch directly electrically connected between the second node and an output node;
a fourth switch directly electrically connected between the second node and the reference potential; and
a capacitive element directly electrically connected between the output node and the reference potential, wherein:
the inductive element is selectively connected/disconnected to the input node by the first switch such that, when connected to the input node, the inductive element stores reactive energy and, when disconnected from the input node, the inductive element transfers stored reactive energy to the output node;
the capacitive element stores the reactive energy received from the inductive element; and
operation of the first through fourth switches causes the buck-boost converter to operate in the buck mode during a buck mode operating stage and boost mode during a boost mode operating stage, the buck mode operating stage and the boost mode operating stage overlapping in part,
the boost mode operating stage including, in response to a first switching operation performed by the first through fourth switches, a first time period during which a first decreasing rate of current flowing from the inductive element having a first slope exists and a second time period during which a second decreasing rate of current, different from the first decreasing rate of current, flowing from the inductive element having a second slope exists, and
during the first time period, the inductive and capacitive elements simultaneously conduct currents flowing through the fourth switch in the same direction without any of the current conducted by the inductive element flowing through the capacitive element.

19. The buck-boost converter of claim 18, wherein the third switch conducts current in each of opposite directions.

* * * * *